(12) United States Patent
Stewart et al.

(10) Patent No.: US 8,616,065 B2
(45) Date of Patent: Dec. 31, 2013

(54) PRESSURE SENSOR

(75) Inventors: Carl Stewart, Plano, TX (US); Alistair Bradley, Hilliard, OH (US); Lamar Ricks, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 13/196,743

(22) Filed: Aug. 2, 2011

(65) Prior Publication Data

US 2012/0125114 A1    May 24, 2012

Related U.S. Application Data

(60) Provisional application No. 61/417,119, filed on Nov. 24, 2010.

(51) Int. Cl.
*G01L 9/06* (2006.01)

(52) U.S. Cl.
USPC .............................. 73/721; 73/727

(58) Field of Classification Search
USPC .................... 73/700–756
See application file for complete search history.

(56) References Cited

U.S. PATENT DOCUMENTS

| | | | |
|---|---|---|---|
| 3,886,799 A | 6/1975 | Billette et al. | |
| 4,008,619 A | 2/1977 | Alcaide et al. | |
| 4,098,133 A | 7/1978 | Frische et al. | |
| 4,618,397 A | 10/1986 | Shimizu et al. | |
| 4,817,022 A | 3/1989 | Jornod et al. | |
| 4,945,762 A | 8/1990 | Adamic, Jr. | |
| 5,088,329 A | 2/1992 | Sahagen | |
| 5,144,843 A | 9/1992 | Tamura et al. | |
| 5,155,061 A | 10/1992 | O'Connor et al. | |
| 5,453,628 A | 9/1995 | Hartsell et al. | |
| 5,459,351 A | 10/1995 | Bender | |
| 5,528,452 A | 6/1996 | Ko | |
| 5,535,135 A | 7/1996 | Bush et al. | |
| 5,551,304 A | 9/1996 | Baskett | |
| 5,578,962 A * | 11/1996 | Rastegar | 330/9 |
| 5,583,295 A | 12/1996 | Nagase et al. | |

(Continued)

FOREIGN PATENT DOCUMENTS

| | | |
|---|---|---|
| JP | 57115873 | 7/1982 |
| JP | 63065679 | 3/1988 |

(Continued)

OTHER PUBLICATIONS

Bitko et al., "Improving the MEMS Pressure Sensor," Sensors, pp. 1-12, Jul. 2000.

(Continued)

*Primary Examiner* — Andre Allen
(74) *Attorney, Agent, or Firm* — Seager Tufte & Wickhem LLC.

(57) ABSTRACT

The present disclosure relates to sensors including pressure sensors. In some cases, the pressure sensor may include a membrane or diaphragm, multiple sense elements connected to one another in a bridge configuration and positioned on the membrane, and an amplifier coupled to an output of the bridge configuration and having an output, where the diaphragm, sense elements and amplifier may be formed on a singled substrate or formed integrally therewith, or both. In one example, the pressure sensor may sense a particular range of pressures applied to the sensor, and/or may include an amplifier that has a selectable gain for amplifying an output of the bridge.

26 Claims, 11 Drawing Sheets

(56) References Cited

U.S. PATENT DOCUMENTS

| | | | |
|---|---|---|---|
| 5,585,311 A | | 12/1996 | Ko |
| 5,641,911 A | * | 6/1997 | Ryhanen .................... 73/718 |
| 5,747,705 A | | 5/1998 | Herb et al. |
| 5,770,883 A | | 6/1998 | Mizuno et al. |
| 5,808,210 A | | 9/1998 | Herb et al. |
| 5,870,482 A | | 2/1999 | Loeppert et al. |
| 6,112,598 A | | 9/2000 | Tenerz et al. |
| 6,131,463 A | * | 10/2000 | Morris ........................ 73/714 |
| 6,150,681 A | | 11/2000 | Allen |
| 6,167,763 B1 | | 1/2001 | Tenerz et al. |
| 6,229,190 B1 | | 5/2001 | Bryzek et al. |
| 6,263,740 B1 | | 7/2001 | Sridhar et al. |
| 6,445,053 B1 | | 9/2002 | Cho |
| 6,452,427 B1 | | 9/2002 | Ko et al. |
| 6,528,340 B2 | | 3/2003 | Haji-Sheikh et al. |
| 6,615,668 B2 | | 9/2003 | Toyoda et al. |
| 6,621,138 B1 | | 9/2003 | Alter |
| 6,923,069 B1 | | 8/2005 | Stewart |
| 6,945,118 B2 | | 9/2005 | Maitland, Jr. et al. |
| 6,958,523 B2 | | 10/2005 | Babcock et al. |
| 7,024,937 B2 | | 4/2006 | James |
| 7,218,093 B2 | | 5/2007 | Cirkel et al. |
| 7,493,823 B2 | | 2/2009 | Stewart et al. |
| 7,918,136 B2 | | 4/2011 | Muchow et al. |
| 2007/0171589 A1 | | 7/2007 | Otake |
| 2007/0238215 A1 | | 10/2007 | Stewart et al. |
| 2007/0295094 A1 | * | 12/2007 | Kurtz et al. .................... 73/714 |
| 2007/0295095 A1 | * | 12/2007 | Kurtz et al. .................... 73/714 |
| 2009/0013791 A1 | * | 1/2009 | Zdeblick et al. ............. 73/700 |
| 2009/0211362 A1 | | 8/2009 | Krog et al. |

FOREIGN PATENT DOCUMENTS

| | | |
|---|---|---|
| JP | 63215929 | 9/1988 |
| JP | 2004012406 | 1/2004 |
| JP | 2004304052 | 10/2004 |

OTHER PUBLICATIONS

Silicon Microstructures Inc., "Low Pressure Transducer Fully Temperature Compensated and Calibrated Dual In-Line Package," SM5651-SM5652 Low Pressure Constant Current/Voltage Dip, 2 pages, 2001-2002.

Warren Schultz, "Interfacing Semiconductor Pressure Sensors to Microcomputers," Freescale Semiconductor, AN1318 Rev 2, 12 pages, May 2005.

Warren Schultz, "Interfacing Semiconductor Pressure Sensors to Microcomputers," Motorola, AN1318, 10 pages, 1997.

Zentrum Mikroelektronik Dresden AG, "ZMD31050/ZMD31150 Advanced Sensor Signal Conditioner," Application Notes, Electronic Offset Compensation, 4 pages, Apr. 13, 2010.

Zentrum Mikroelektronik Dresden AG, "ZSC31050 Advanced Differential Sensor Signal Conditioner," Functional Description, 50 pages, Jul. 29, 2010.

Search Report for Corresponding Application No. 11190426.4-1236/2461147 Dated May 8, 2012.

* cited by examiner

PRESSURE SENSOR

This application claims the benefit of U.S. Provisional Application Ser. No. 61/417,119, filed Nov. 24, 2010, and entitled "PRESSURE SENSOR", which is hereby incorporated by reference.

TECHNICAL FIELD

The present disclosure relates generally to sensors, and more particularly to pressure sensors.

BACKGROUND

Sensors are commonly used today to sense environmental parameters such as temperature, humidity, pressure, flow, thermal conductivity, gas concentration, light, magnetic fields, electric fields, as well as many other environmental parameters. Such sensors are used in a wide variety of applications including, for example, medical applications, flight control applications, industrial process applications, combustion control applications, weather monitoring applications, water metering applications, as well as many other applications.

SUMMARY

This disclosure is directed to several alternative designs, materials and methods of manufacturing electrically responsive sensors. Although sensors are known to exist, there is a need for improvement to such sensors.

Accordingly, one illustrative aspect of the disclosure includes a pressure sensor having a membrane, two or more sense elements having an output, and an amplifier receiving an input from the sense elements and having its own output, where the membrane, sense elements and amplifier may be disposed on a substrate. The membrane may be a diaphragm, where the diaphragm is capable of flexing in response to a media impinging thereon. The two or more sense elements may be disposed on the membrane and may have a property that varies with the extent to which the diaphragm flexes. For example, the sense elements may be piezoresistors arranged to form a sense bridge (e.g., a Wheatstone bridge) having an output that is proportional or otherwise related to the pressure on the diaphragm caused by the media impinging thereon. In one example, the amplifier may have an output that is proportional or otherwise related to the output of the sense bridge. Further, the output of the amplifier may have a span, where the span may be the difference between a minimum output value and a maximum output value. In an example, the output span of the amplifier may be at least greater than two times the sensitivity of the membrane.

In some instances, the membrane of the pressure sensor may have an input pressure range in which it operates, where the input pressure may result from a media impinging thereon. This input pressure range may cause the output of the amplifier to go, and remain, between its minimum output value and its maximum output value. The relationship between the input pressure range and the span of the output value of the amplifier may be such that the output of the amplifier has a Terminal Based Linearity (TBL) of less than a particular percent deviation from a straight line connecting the minimum output value to the maximum output value.

In some cases, the membrane or diaphragm may be configured to withstand media impinging thereon across a range of input pressures between a negative burst pressure and a positive burst pressure. An amplifier receiving an input from a sense bridge attached to the diaphragm may have an output range that corresponds to no more than a particular percentage of the range of input pressure on the diaphragm or membrane.

In some further instances, the pressure sensor may operate by receiving a supply voltage and in response to pressure applied to or not applied to the diaphragm, amplifier may output an output signal. For example, the amplifier may output a common mode signal that is proportional to a magnitude of the supply voltage, and a maximum differential output within a particularly defined range, or the amplifier may have other desirable output characteristics or values or both.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the disclosure.

Figure 1:
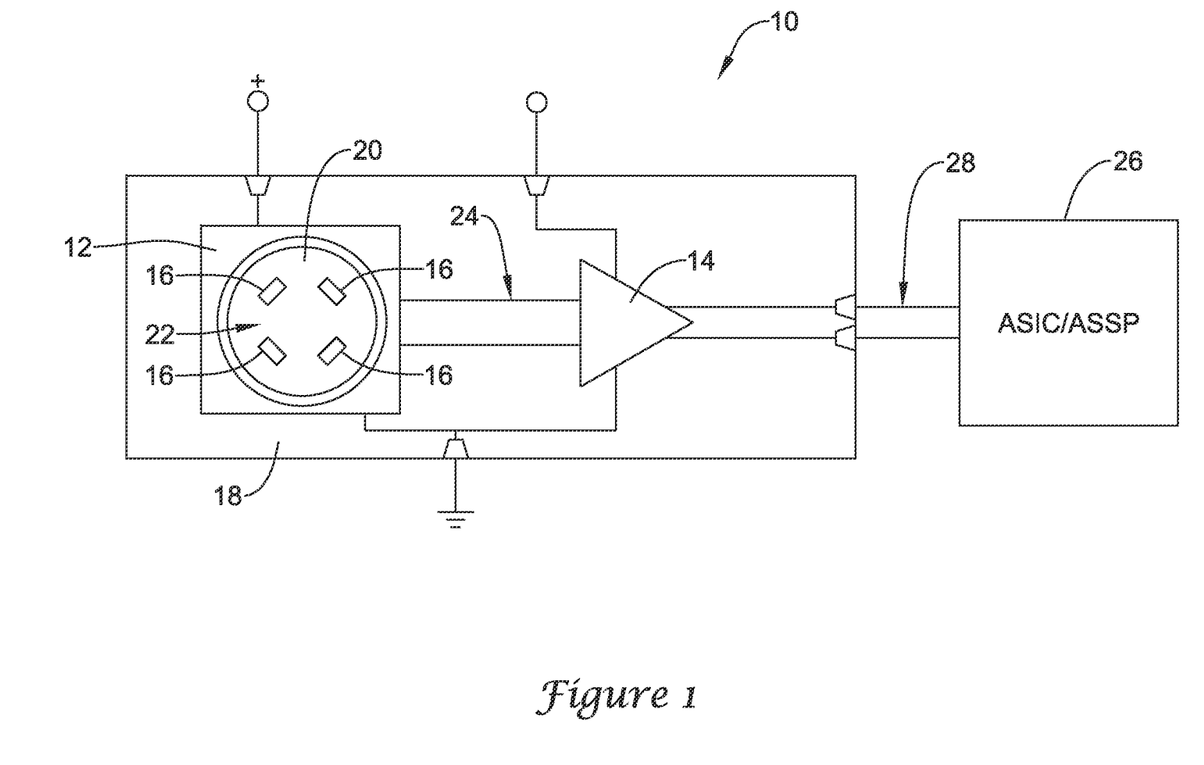
FIG. 1 is a schematic view of an illustrative sense die amplifier combination in accordance with an aspect of the disclosure.
Figure 2:
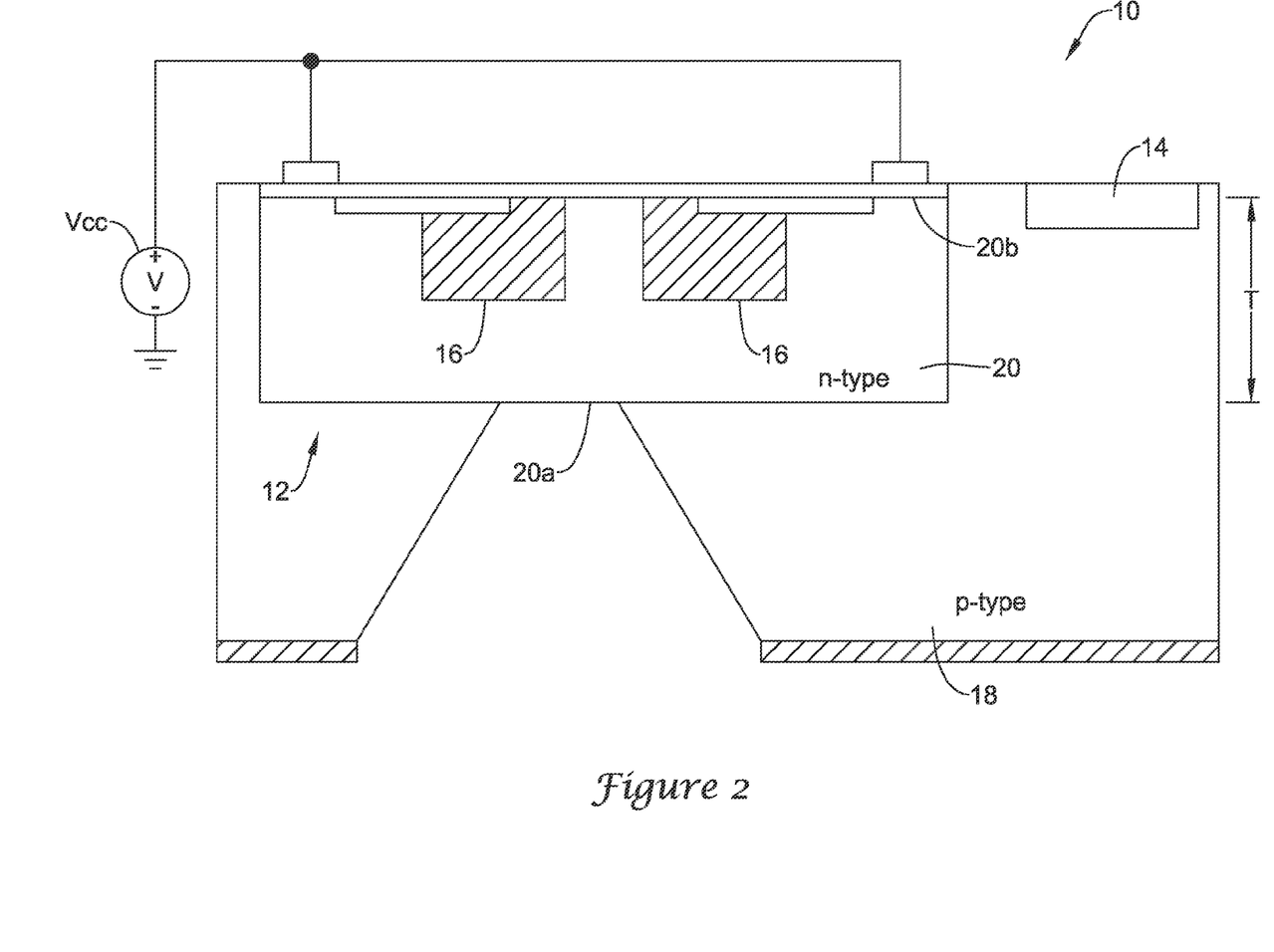
FIG. 2 is a schematic cross-sectional view of an illustrative sense die amplifier combination in accordance with an aspect of the disclosure.

Referring to the Figures, and in one illustrative embodiment, a sense die amplifier combination or pressure sensor device 10 may have a sense die 12 and amplifier 14, where sense die 12 may include a membrane or diaphragm 20 (the terms "membrane" and "diaphragm" may be used interchangeably herein) and resistor(s) 16 both positioned on, or formed with, a substrate 18, as seen in FIGS. 1 and 2. In some instances, resistors 16 (e.g., piezoresistors) may be formed on diaphragm 20 and configured in such a manner that their resistance may change in response to flexing of diaphragm 20. The combination of diaphragm 20 and piezoresistors 16 connected to form a circuit may generally be considered sense die 12 formed on, or integrally with, substrate 18. In some cases, amplifier 14 (e.g., an integrated differential amplifier or a different variety of amplifier) may be fabricated on substrate 18 near or proximate sense die 12 and may have an input coupled to an output of circuit 22, where amplifier 14 may be coupled to circuit 22 through an electrical connection or coupling 24 (e.g., a wired connection or wireless connection) or through any other coupling technique known in the art to be capable of transferring an output from circuit 22 to amplifier 14. In a similar or different connection, an output from amplifier 14 may be connected or coupled to external system(s) 26, through an electrical connection 28 (e.g., a wired connection or wireless connection) or through any other connection or coupling technique known in the art to be capable of transferring a signal from amplifier 14 to external system 26. External system 26 may be any system capable of utilizing a signal from the amplifier 14; for example, external system 26 may be an Application Specific Standard Part (ASSP) or an Application Specific Integrated Circuit (ASIC) or other capable system or part, as desired.

Generally, device 10 may operate by circuit 22 receiving a supply voltage $V_{cc}$ and in response to pressure applied to, or not applied to, diaphragm 20, sense die 12 may output a voltage to amplifier 14, where the value of the output voltage is proportional or otherwise related to the pressure applied to diaphragm 20 by a sensed media. In some cases, Amplifier 14 may be a differential amplifier and may output a common mode signal that is proportional to a magnitude of the supply voltage $V_{cc}$ (e.g. about one half of the supply voltage $V_{cc}$) and a maximum differential output within a particularly defined range.

The Diaphragm

In operation, and as pressure is applied to or impinged upon diaphragm 20, diaphragm or membrane 20 may deflect relative to a rest position and proportional or otherwise related to the applied pressure impinging thereon. Membrane or diaphragm 20 may be configured such that it is capable of withstanding media impinging thereon across a range of input pressures that span a negative burst pressure and a positive burst pressure, where the burst pressure may generally be defined as the pressure at which a system is expected to fail. In response to the applied pressure, diaphragm 20 may have a maximum amount of deflection relative to a rest position per unit of pressure applied thereto. Illustrative examples of maximum deflection of membrane or diaphragm 20 may include less than 10.0 microns at 1" $H_2O$, less than 2.0 microns at 1" $H_2O$, less than 1.0 micron at 1" $H_2O$, less than 0.1 micron at 1" $H_2O$ or other maximum deflection value. In response to the deflection, the configuration of diaphragm 20 may be such that when a greater input pressure is applied to a first side 20a than to a back side 20b of diaphragm 20, the output of sense die 12 may be a positive output signal and may result in a positive output signal from amplifier 14. Likewise, when a greater input pressure is applied to back side 20b than to front side 20a of diaphragm 20, the output of sense die 12 may be a negative output signal and may result in a negative output signal from amplifier 14.

Figure 5:
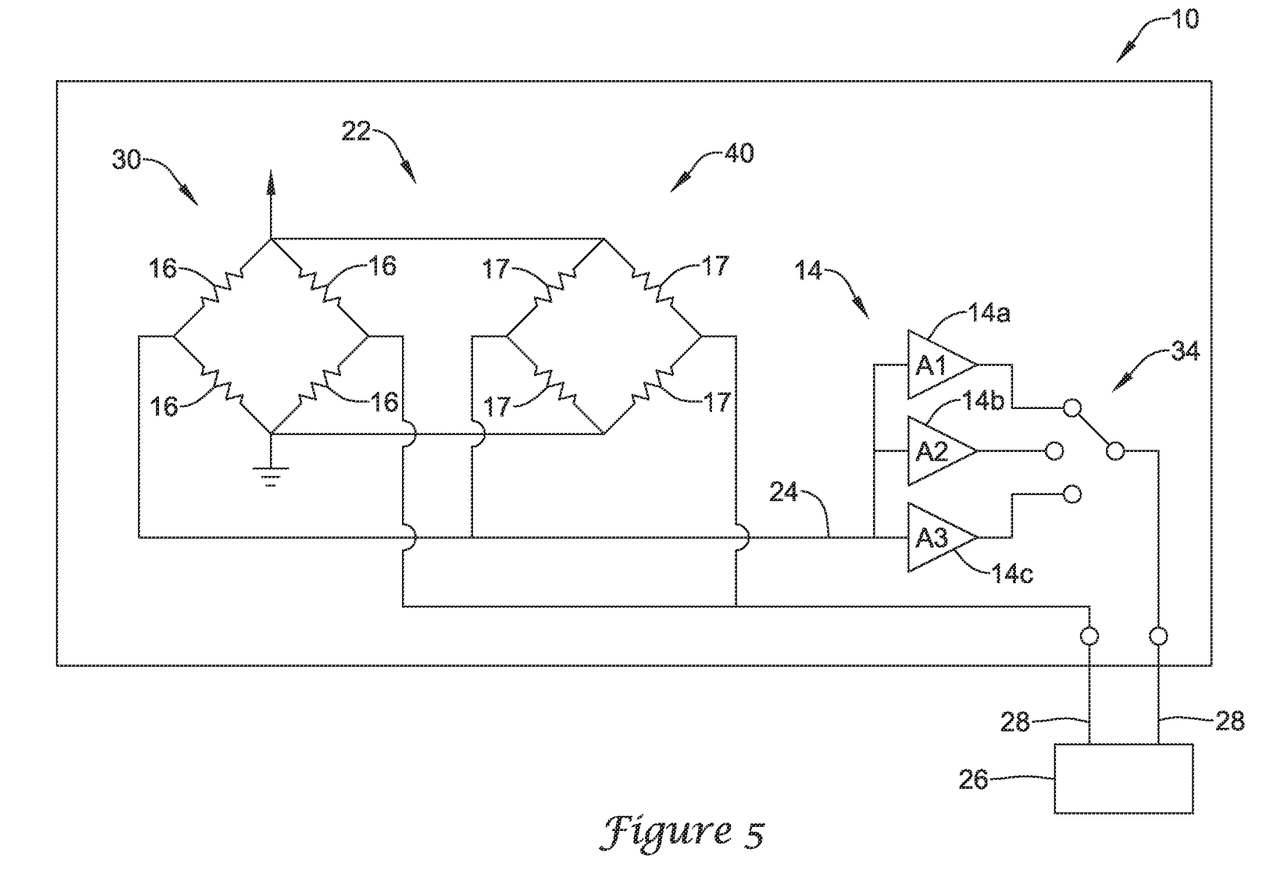
FIG. 5 is schematic view of an illustrative sense die amplifier combination having a sense bridge, trim bridge and amplifier circuits in accordance with an aspect of the disclosure.
Figure 6A:
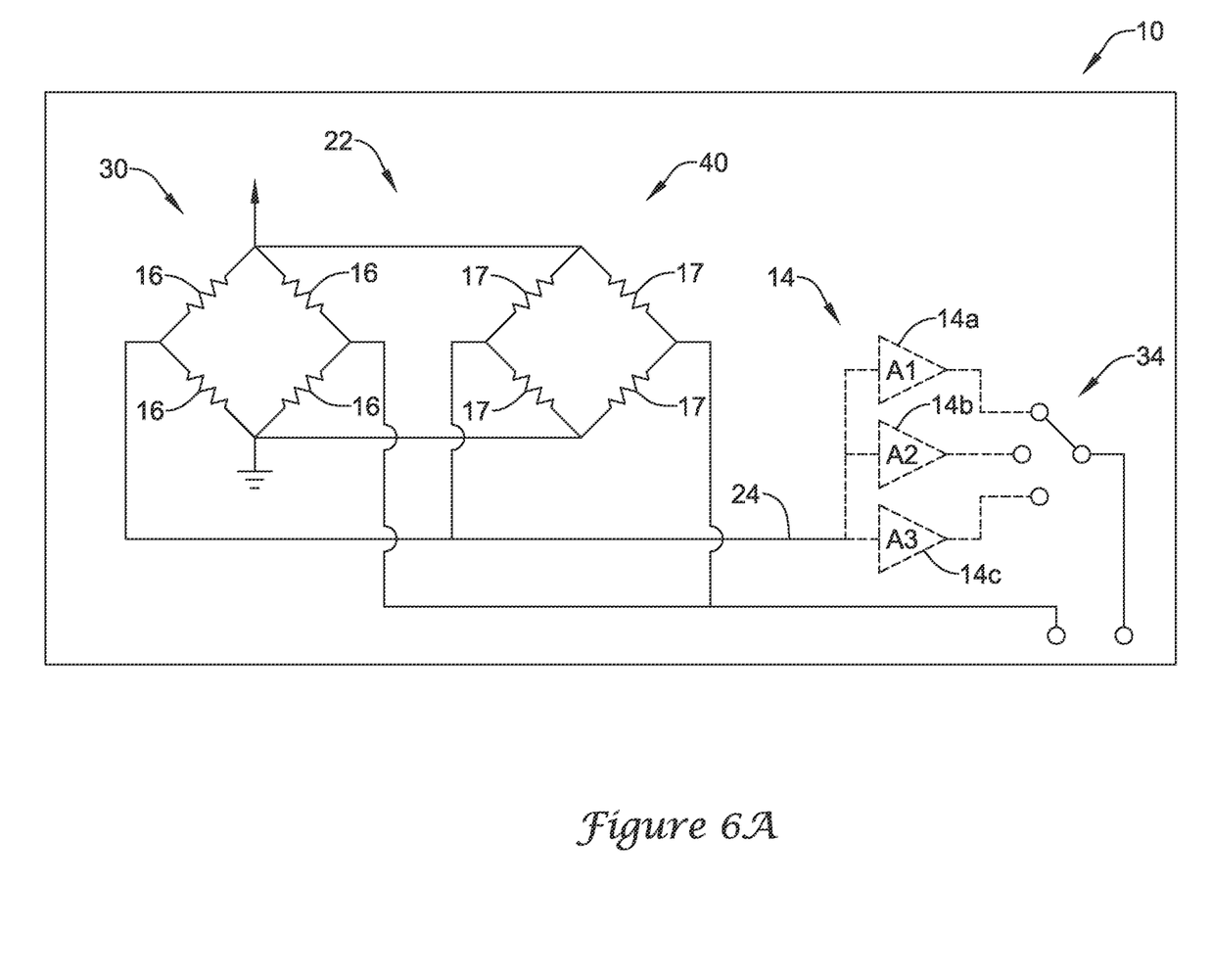
FIGS. 6A and 6B are schematic views of an illustrative sense die amplifier combination where there is a selection of an amplifier in accordance with an aspect of the disclosure.
Figure 6B:
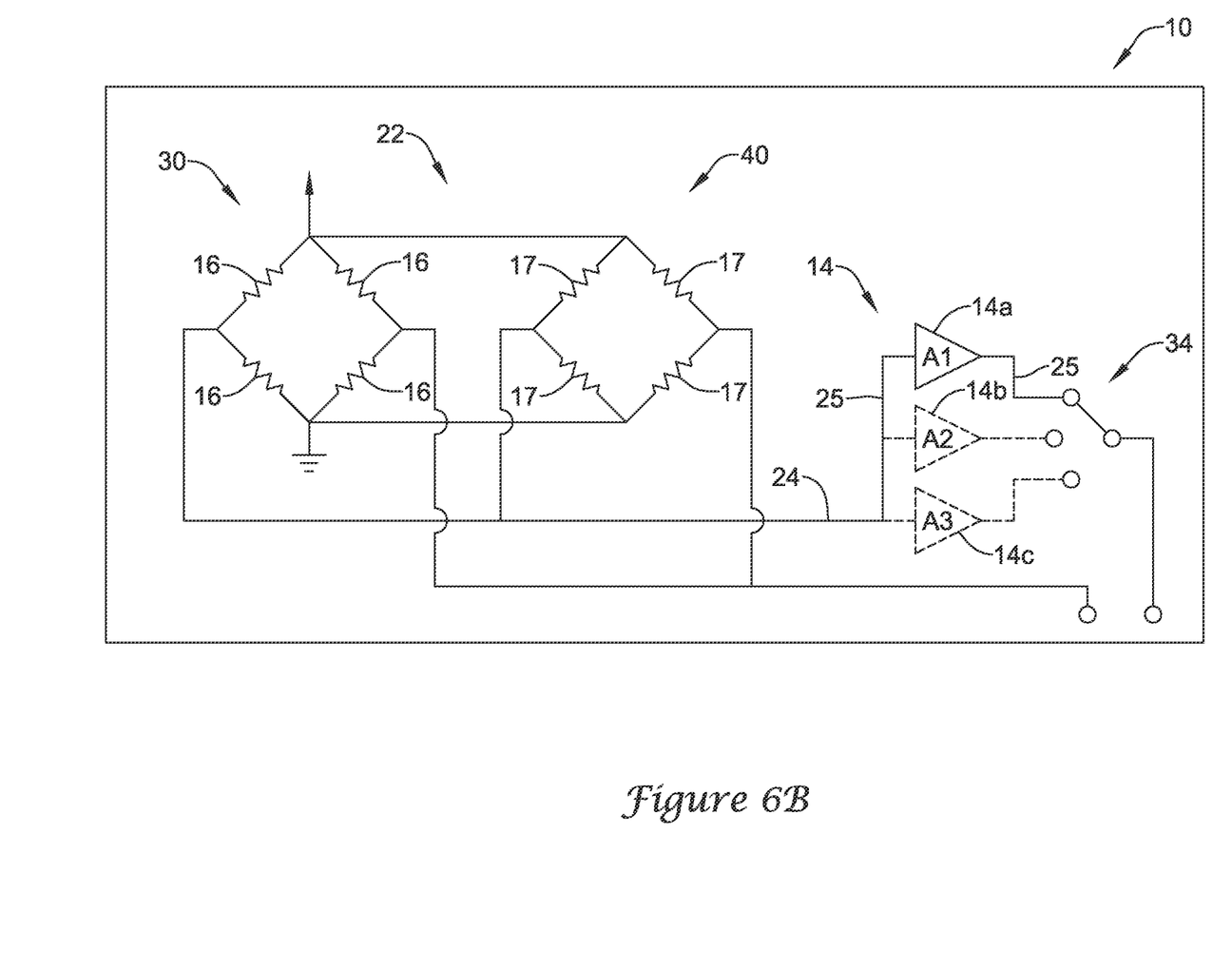
Figure 7:
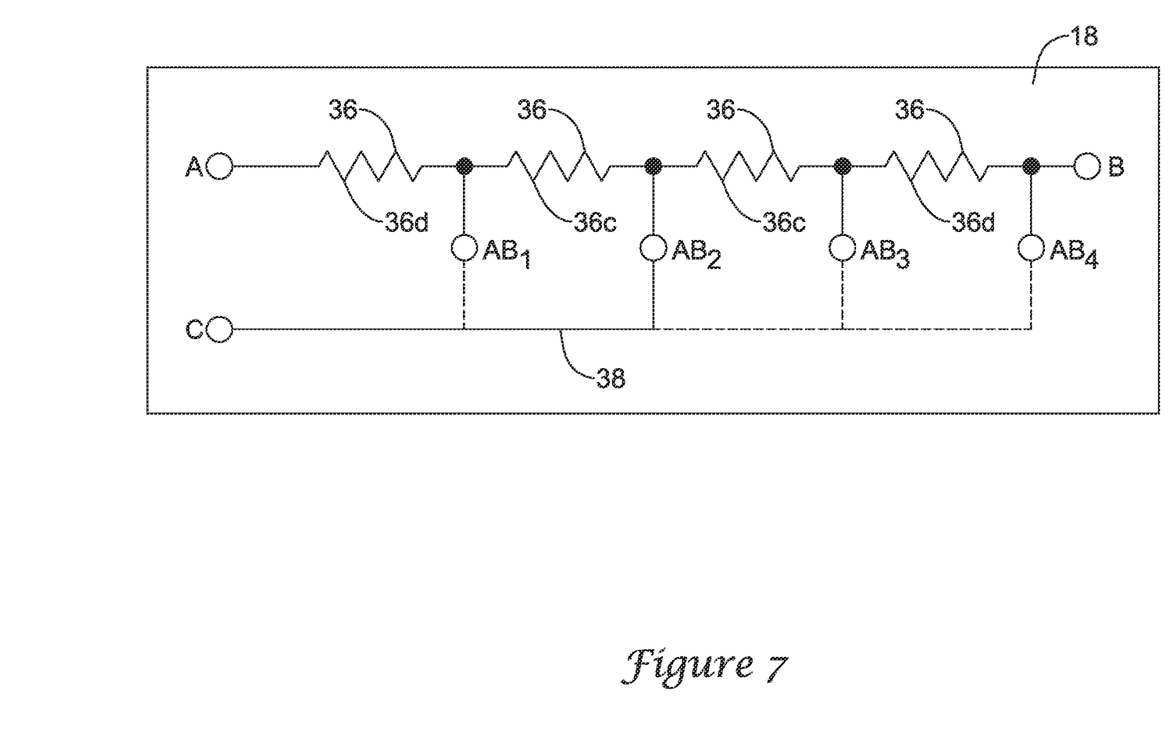
FIG. 7 is a schematic view of a portion of an illustrative sense die amplifier where an amplifier gain may be selected through the control of resistance values in accordance with an aspect of the disclosure.

Diaphragm 20 may be formed in a central portion of sense die 12, as seen in FIG. 1, or in another position with respect to sense die 12, with various circuitries deposited around the periphery of diaphragm 20 (such as the circuitry illustrated in, and described with reference to, FIGS. 5-7). In addition to, or as a part of the circuitry, various external connection pads may be provided along the periphery—by way of example, pads 52 illustrated in FIG. 9 may be included on or around diaphragm 20. The circuitry may include resistors 16a-16d forming sense bridge 30, where bridge 30 may be positioned in a central region of sense die 12 comprising diaphragm 20, as also seen in FIG. 1. In an example, diaphragm 20 may be square or circular or another shape, with a length (not shown) or diameter (not shown), and dimensions capable of comprising resistors 16 disposed thereon. In the example, the length of diaphragm 20 may be approximately 1.9 mm and the overall die dimensions may be in the range of 2.5-3.5 mm square. In other examples, the length or diameter may be 10 mm, 5 mm, 2.5 mm, 1 mm, 500 μm, 100 μm, 50 μm, or some other suitable dimension; and the overall dimensions may be scaled appropriately to fit the associated circuitry, as desired.

In addition to having a length, diaphragm 20 may have a thickness T. FIG. 10 illustrates a cross-section of diaphragm 20, where thickness T of diaphragm 20, as illustrated, may have one of a plurality of values $T_1$, $T_2$, $T_3$ or other value. For example, based on an etch process (e.g., a variable depth etch or other manufacturing technique) by which the diaphragm 20 may be formed, thickness T may have a thickness of $T_1$, $T_2$ or $T_3$, where $T_1$ may be approximately 10-12 microns, $T_2$ may be approximately 16-17 microns, and $T_3$ may be approximately 28 microns, but these are only examples. In the example, sense die 12 may have the circuitry depicted in FIG. 4-7 or 9 or other circuitry and may be formed with diaphragm 20 having a thickness T with a value of $T_1$, $T_2$ or $T_3$, or other value. Thus, a desirable thickness T may be dynamically selected during the manufacturing process to suit a particular customer's application.

Diaphragm 20 may be a membrane made of any material capable of being connected to or formed integrally with substrate 18 (e.g., a silicon substrate or a substrate capable of being manipulated as described herein), capable of having thickness T, and capable of flexing in response to a media communicating or impinging on a surface thereof. A formed diaphragm 20 of a particular material may have a sensitivity that is dependent on the geometry of diaphragm 20, where the sensitivity may be defined as the change in output voltage (mV) per unit of supply voltage (e.g., $V_{cc}$ supply) per unit of input pressure (e.g. 1"$H_2O$). That is, sensitivity of diaphragm 20 may be specified in millivolts of output voltage, per volts of supply voltage, per unit of input pressure, or other appropriate unit of measurement. Illustrative examples of sensitivities of diaphragm 20 may include a sensitivity less than 1.0 mV/V/1" H2O, a sensitivity less than 2.0 mV/V/1" H2O, a sensitivity less than 4.0 mV/V/1" H2O, a sensitivity less than 10 mV/V/1" H2O, a sensitivity less than 100 mV/V/1" H2O, or other sensitivity.

The Sense Element Circuits

In some embodiments, sense elements or resistors 16 may be piezoresistors or any other type of resistor capable of signaling or indicating different pressures applied to or on diaphragm 20. For example, resistors 16 may have characteristics or properties (e.g., resistance or other properties) that change in response to pressures applied to or on diaphragm 20. In operation, when resistors 16 are placed in an appropriate circuit 22, such as forming a first bridge or sense bridge 30 on diaphragm 20, such as a Wheatstone bridge seen in FIGS. 4-6B and 9, and supply voltage $V_{cc}$ is applied to circuit 22, an electrical signal may be generated that is related to the pressure of a media contacting or impinging on diaphragm 20.

Figure 9:
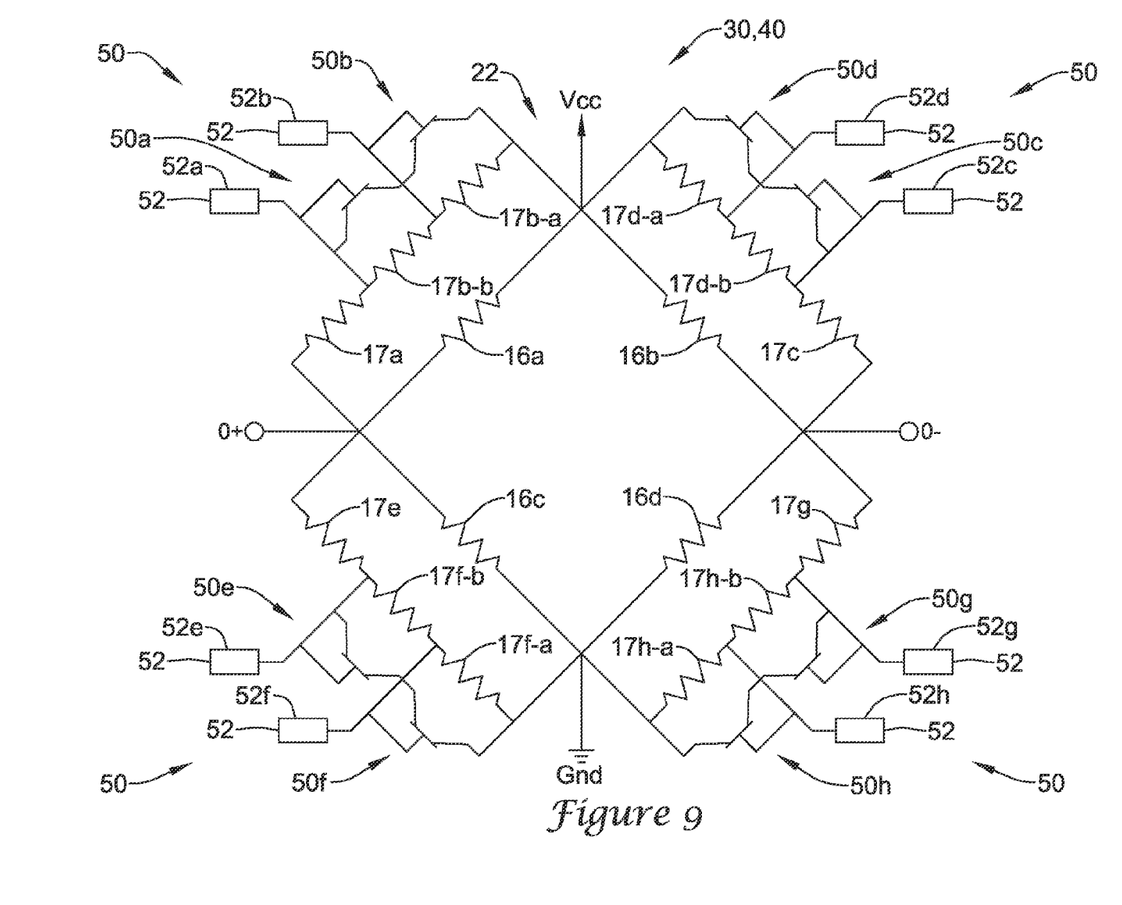
FIG. 9 is a schematic view of an illustrative sense bridge and electrically parallel trim bridge in accordance with an aspect of the disclosure.
Figure 10:
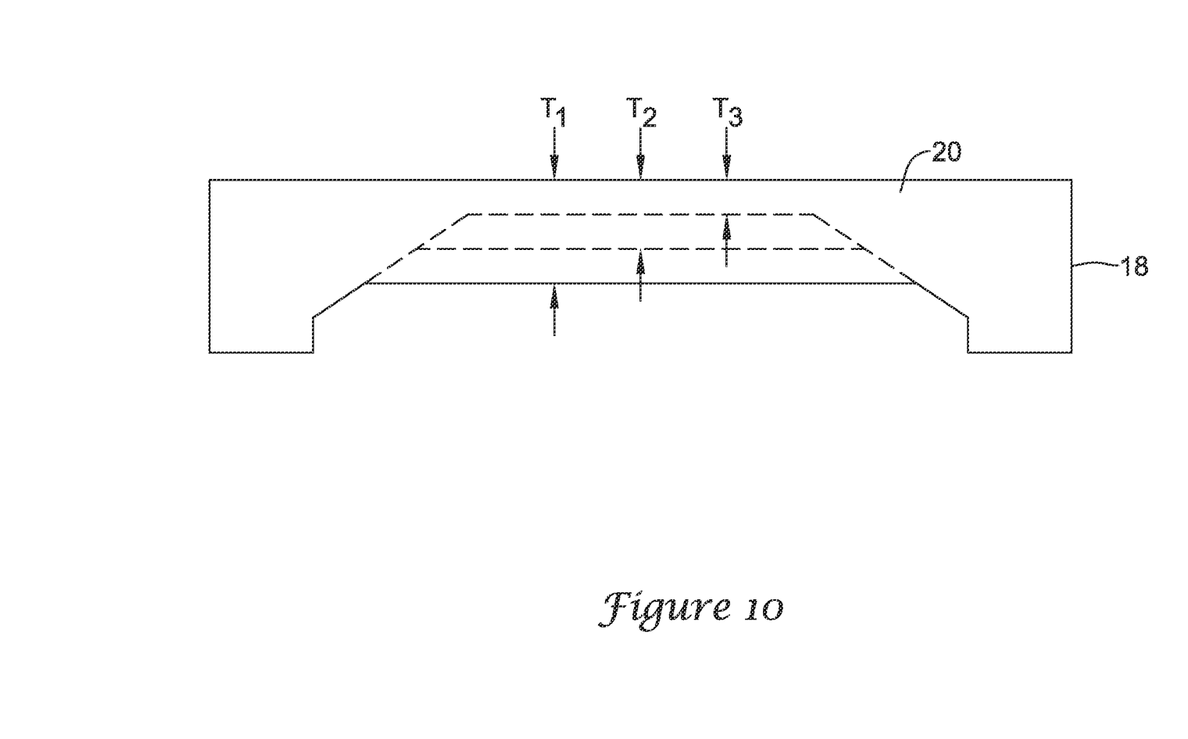
FIG. 10 is a cross-sectional view of an illustrative diaphragm and substrate in accordance with as aspect of the disclosure.

In addition to sense bridge 30, a second bridge or trim bridge 40 may in some cases be applied to circuit 22, as illustrated in FIGS. 5-6B and 9. Trim bridge 40 may be coupled in parallel to sense bridge 30, and may be capable of trimming sense bridge 30 and varying resistance across legs 32 of sense bridge 30 or trimming sense bridge 30 in another manner. When elements of trim bridge 40, as seen in FIG. 9, are trimmed or triggered, trim bridge 40 may permanently, or otherwise, offset an output voltage produced at an output of sense bridge 30, where the output voltage may be a differential output having a common mode voltage or any other type of output voltage. Further, an order of how the elements of trim bridge 40 are triggered or trimmed, if at all, may depend on different selected gains of amplifier 14 or other variables and values of the other variables.

With reference now to FIG. 9, an illustrative implementation of an active sense die having trim bridge 40 electrically in parallel to sense bridge 30 is described. As illustrated, a sense bridge 30 may include resistors 16 (e.g., sensor resistors 16a, 16b, 16c, 16d), arranged in a Wheatstone bridge configuration. In parallel to sense bridge 30, a plurality of trim resistors 17 (e.g., trim resistors 17a, 17b-a, 17b-b, 17c, 17d-a, 17d-b, 17e, 17f-a, 17f-b, 17g, 17h-a, 17h-b) may at least partially form parallel trim bridge 40. Trim bridge 40 may be configured in such a manner that its resistance may be modified post fabrication, for example, through a diode zapping process, fuse blowing process, or other suitable process.

In the illustrative example, a number of diode-connected transistors 50a-h having pads 52a-h may be connected in parallel to various trim resistors 17a-h. As seen in FIG. 9, a diode-connected transistor 50a may be in parallel with 17b-b; a diode-connected transistor 50b may be in parallel with 17b-a; a diode-connected transistor 50g may be in parallel with 17h-b; etc. By shorting a diode-connected transistor 50, resistor 17, which may be in parallel to diode-connected transistor 50, may be shorted and may effectively be removed from bridge 40. Through this technique, a resistance of the corresponding leg of trim bridge 40 may be reduced or otherwise modified.

Diode shorting or zapping may be accomplished through use of external contact pads 52. For example, pads 52a, 52b may provide contacts for zapping or shorting one or both of diode connected transistor 50a and diode connected transistor 50b, to remove (i.e., short out) resistor 17b-b or 17b-a of trim bridge 40. That is, by applying an appropriate voltage across 52a and 52b, diode connected transistor 50a may be shorted out, thereby removing 17b-b from the 17a-17b-b-17b-a leg of trim bridge 40. As described above, resistance across trim bridge 40 may be adjusted to at least partially control a common mode voltage of sense bridge 30 (e.g., the voltage outputted at pads 0+ and 0−), given an appropriate voltage supply $V_{cc}$ and ground connection at the respective $V_{cc}$ and GND pads.

The Amplifier(s)

Amplifier 14 may be a differential in and differential out amplifier, or any other type of amplifier 14 capable of sensing variation in the properties of sense elements or resistors 16 and amplifying the sensed variations. In response to sensing the variations in the properties of resistors 16, illustrative amplifier 14 may have an output that spans a full range (e.g. from a minimum output value to a maximum output value) that correspond to only a particular portion of the input pressure range of which diaphragm 20 may be capable of withstanding. As noted above, membrane or diaphragm 20 may be configured such that it is capable of withstanding media impinging thereon across a range of input pressures that span a negative burst pressure and a positive burst pressure, where the burst pressure may generally be defined as the pressure at which a system is expected to fail. Illustrative examples of portions of the input pressure range in which amplifier 14 spans a full range may include 50% of the input pressure range, 10% of the input pressure range, 5% of the input pressure range, 2% of the input pressure range, 1% of the input pressure range, or less. For example, where diaphragm 20 has an input pressure range of one hundred inches of water and the output of the amplifier 14 spans its full range over zero to ten inches of water, amplifier 14 may be said to have an output that spans 10% of the range of input pressure.

Further, output of amplifier 14 may be quantified in relation to supply voltage $V_{cc}$, where amplifier 14 may have a maximum differential output within a particular range corresponding to supply voltage $V_{cc}$. For example, amplifier 14 may have an output with a common-mode signal of approximately one-half a magnitude of the supply voltage $V_{cc}$. In some cases, the amplifier 14 may have a maximum differential output within the range of 6 mV to 180 mV. Alternatively, or additionally, amplifier 14 may have a common mode signal in other proportions to supply voltage $V_{cc}$, and/or other maximum differential outputs as desired.

Amplifier 14 may have an output span, where the span may be the difference between the minimum output value and the maximum output value of amplifier 14, which may be measured in millivolts per volt per unit of pressure (e.g., inch of water) or other appropriate unit of measurement. In one example, the output span of amplifier 14 may be at least greater than two times the sensitivity of membrane 20. Illustrative examples of values of the output span of amplifier 14 may include an output span greater than 2.0 mV/V/1" $H_2O$, an output span greater than 4.0 mV/V/1" $H_2O$, an output span greater than 8.0 mV/V/1" $H_2O$, an output span greater than 10 mV/V/1" $H_2O$, an output span greater than 100 mV/V/1" $H_2O$, an output span greater than 1000 mV/V/1" $H_2O$ or other value of an output span. In this example, the membrane may have a sensitivity of less than 4.0 mV/V/1" $H_2O$. Also, in some cases, the amplifier may have a selectable gain that is greater than 2.0 mV/V/1" $H_2O$ or even 6 mV/V/1" $H_2O$ or more.

As alluded to above, the gain of amplifier 14 may have various values and may be selectable as described further herein. A selectable gain main include a gain that is selectable during manufacture of device 10, or a gain that is selectable by a user of device 10. In some cases, such as where the span of the amplifier is greater than two times the sensitivity of membrane 20, a gain of amplifier 14 may be set at two. Other illustrative examples of the gain of amplifier 14 may include three or more, four or more, six or more, or a different higher or lower value.

It is contemplated that amplifier 14 may have a particular Terminal Based Linearity (TBL), where for a given absolute input pressure, TBL may be the maximum deviation of output of amplifier 14 from a straight line intercepting a minimum output value and a maximum output value of amplifier 14. TBL may be measured in percent deviation from the straight line between the minimum output value and the maximum output value. Illustrative examples of a TBL for amplifier 14 may include a TBL of less than 1% from a line extending between the minimum output value to the maximum output value, less than 0.50% from a line extending between the minimum output value to the maximum output value, less than 0.1% from a line extending between the minimum output value to the maximum output value, less than 0.05% from a line extending between the minimum output value to the maximum output value or other TBL value.

The Design and Manufacture of the Device

Figure 4:
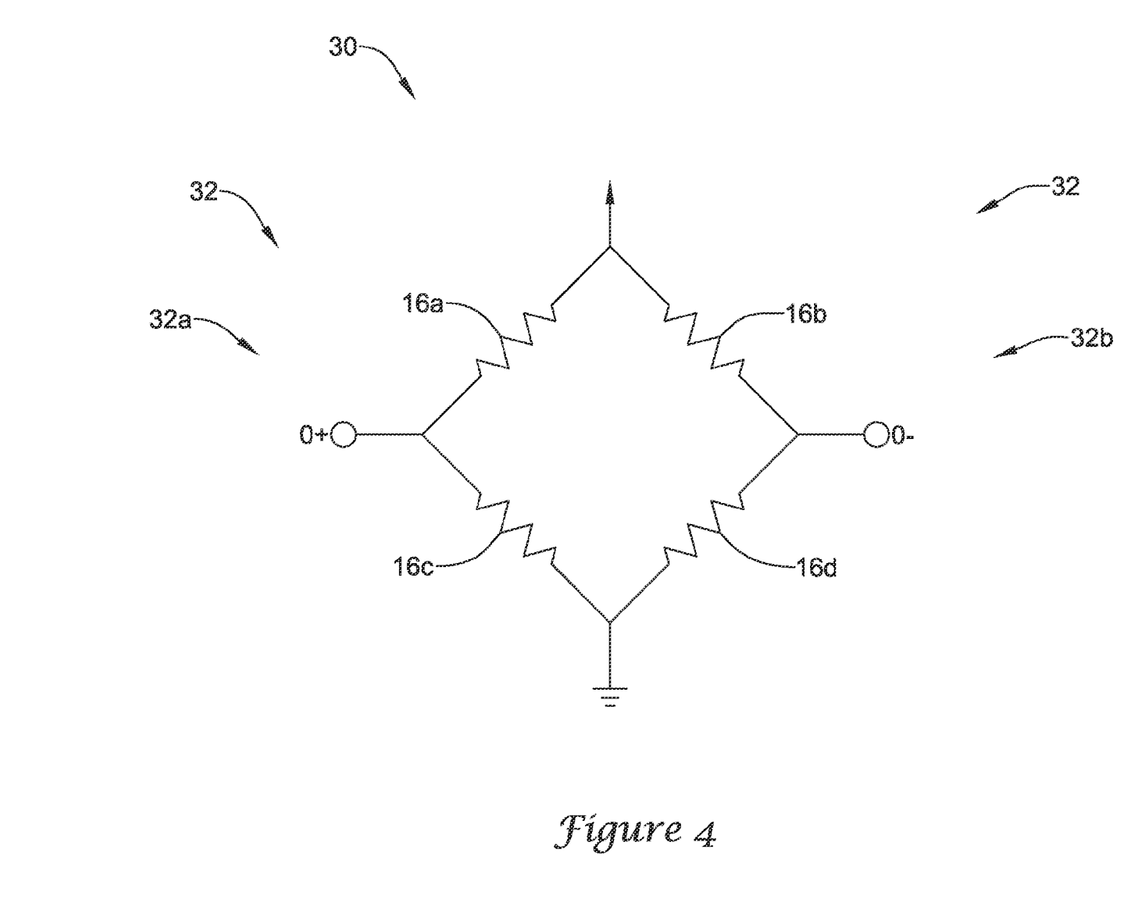
FIG. 4 is a schematic view of an illustrative circuit of a sense die in accordance with an aspect of the disclosure.

As discussed, illustrative circuit 22 formed with resistors 16 may include a sense bridge 30, such as a Wheatstone bridge, on diaphragm 20, as shown for example in FIG. 4. First, second, third and fourth resistors 16a, 16b, 16c, 16d may be configured in sense die 12 in such a way that flexure of diaphragm 20 may cause the resistance of legs 32 of the Wheatstone bridge (i.e., first leg 32a formed by first resistor 16a and second resistor 16b, and second leg 32b formed by second resistor 16b and fourth resistor 16d) to adjust differently with respect to each other, such that a differential output at outputs 0+ and 0− varies in a manner related to pressure impinging on diaphragm 20. The differential output of sense bridge 30 may be expressed in terms of millivolts, per volt of supply voltage, per pressure unit, or in any other desired or appropriate unit of measurement. That is, sense bridge 30 may provide a certain number of millivolts of differential output, per volt of supply voltage, per pressure unit (such as inches of water, millimeters of mercury, kilo-Pascals, etc.).

Although circuit 22 may be configured such that a common mode voltage of the outputs 0+ and 0− is approximately half of the supply voltage $V_{cc}$, the relationship between the magnitude of the differential voltage output relative to the magnitude of the pressure impinging on diaphragm 20 (e.g. sensitivity of the diaphragm) may be related to thickness T and an area of diaphragm 20. More specifically, given the same configuration and design of a circuit 22 (i.e., the same resistor 16 construction, in terms of materials and dimensions; and the same placement of those resistors 16 on diaphragm 20) and the same input pressure, the differential output of circuit 22 may be greater for a thinner diaphragm 20 than it may be for a thicker diaphragm 20 of the same size. Similarly, given the same configuration and design of circuit 22 and the same input pressure, the differential output of circuit 22 may be greater for a larger diaphragm 20 (based on surface area) than it is for a smaller diaphragm 20. Thus, by changing dimensions (e.g., shape, surface area, thickness, etc.) of diaphragm 20, one may be able to customize the differential output of circuit 22 (e.g. customize the sensitivity of the diaphragm) for a given supply voltage and range of input pressures. Changing the design and placement of the resistors 16 on diaphragm 20 may enable further customization of the sense bridge 30 output.

Figure 3:
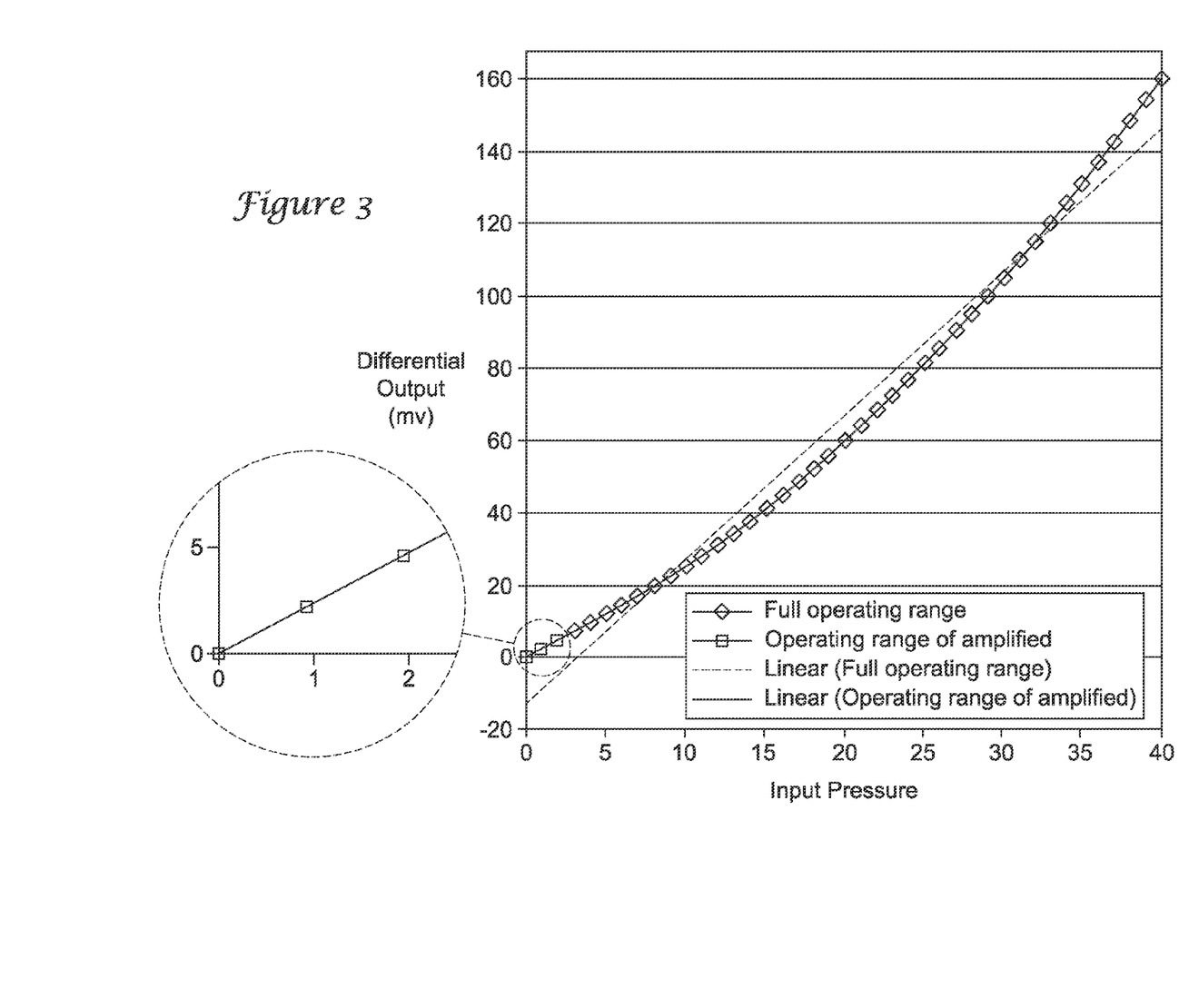
FIG. 3 is an illustrative graphical view of a differential output span of a sense die in accordance with an aspect of the disclosure.

For a given shape and dimension of sense die 12, the differential output span of sense bridge 30 on sense die 12 may often vary non-linearly with the corresponding range of applied input pressure, as graphically illustrated in FIG. 3, where the x-axis depicts pressure applied to sense die 12 and the y-axis depicts the differential output of sense bridge 30 in millivolts. In the example shown, and with reference to FIG. 3, the differential output may be approximately 160 mV at approximately 40 units of input pressure; approximately 42 mV at approximately 15 units of input pressure; and approximately 20 mV for approximately 8 units of input pressure. As these relationships and their graphical depiction in FIG. 3 illustrate, over a large input pressure range, the different output voltage can be significantly nonlinearly. However, over a smaller range of input pressures (e.g. between 9-11 units of input pressure), the differential output can be substantially linear.

As discussed above, trim bridge 40 may provide compensation to a sense bridge 30 output to remove some of the above-described non-linearity. The compensation may also correct for temperature variation and any other non-linearity in the output of the sense die 12. Alternatively, or in addition, it is contemplated that the sensitivity of the diaphragm 20 may be substantially reduced by increasing its thickness T or reduce is dimensions so that the diaphragm 20 is more linear but less sensitive to input pressure, and the output of the sense bridge may then be amplified to gain resolution. In some cases, the output signal of the sense bridge may be amplified and converted to a usable range and form (e.g., a 0-5V ratiometric output, a 4-20 mA analog signal, a digital output value, etc.).

As described, sense die 12 may include co-located active circuitry (i.e., active circuitry on the same substrate in with pressure diaphragm 20 is formed, such as trim bridge 40 or amplifier 14), where the co-located active circuitry may be circuitry for any purpose. For example, the co-located active circuitry may be amplification or compensation circuitry. More specifically, as illustrated in FIG. 5, active sense die 12 may include sense bridge 30 (e.g., a Wheatstone sense bridge, as depicted), trim bridge 40 that may be electrically coupled (e.g., coupled in parallel) to sense bridge 30, and one or more amplifier circuits 14 (e.g., depicted amplifier circuits 14a, 14b, 14c) that may be coupled to the sense-trim bridge 30, 40 combination. Amplifier(s) 14 may have differential outputs or amplifier(s) 14 may have single ended outputs, depending on the desired configuration.

In some instances, each amplifier 14 may have a different gain and a selector circuit 34 may be utilized to select which one of a plurality of amplifier circuits 14 provides the output of active sense die 12. For example, as illustrated in FIG. 5, sense die 12 may include a plurality of amplifier circuits 14a, 14b, 14c, and a multiplexer 34 to couple a particular amplifier 14 to the output of the active sense die 12. In sense die 12, in which each amplifier 14 may provide a different gain, selector 34 may effectively select the gain of sense die 12.

Alternatively or in addition, a plurality of amplifiers 14 with different gains may be formed, and the final gain selection/amplifier selection may be made after (or during) fabrication of the sense die 12. Selection of amplifier 14 to be used in device 10 may be selected in at least one of a variety of ways. For example, a plurality of resistors may be formed along with multiple diodes or transistors in parallel that may be shorted (e.g., diode-zapped, or one-time programmed) to select a final resistance that can, in turn, determine the gain of a corresponding amplifier 14. As another example, a plurality of amplifier circuits 14a, 14b, 14c with different gains may be formed in series with diodes that may be shorted; by shorting only one of the series diodes, only one particular amplifier 14 may be used in the circuit of sense die amplifier combination 10. As another example, a diode may be shorted to control a multiplexer 34 that selects one amplifier 14 among a plurality of amplifiers 14a, 14b, 14c. In still another example, one or more blowable fuses may be provided on sense die 12, which depending on the fuse(s) that are blown, select and/or set a gain of a corresponding amplifier 14 and/or control a multiplexer 34 that selects one amplifier 14 among a plurality of amplifiers 14a, 14b, 14c. As yet another example, control of a multiplexer 34, such as is shown in FIG. 5, may be provided by an external signal, or by a value programmed into a writeable/rewriteable registry or memory device. Not all selection techniques are shown in the Figures, as it is believed the selection techniques not illustrated in the Figures are individually well known techniques in the art of making selections within circuitry.

In a further example, a plurality of amplifiers 14a, 14b, 14c with different gains may be selected, but only a subset of the possible number of amplifiers 14 may actually be completely formed; or one amplifier may be formed with one of multiple possible gains, but only one specific gain may be selected and formed during the fabrication process. One implementation of such an example is illustrated in FIGS. 6A and 6B, where FIG. 6A depicts dotted lines to show potential connections 25 between coupling 24 and potential amplifiers 14. As illustrated, selection of amplifiers 14a, 14b, 14c with different gains of A1, A2 and A3, respectively, may be possible (see FIG. 6A), and during fabrication, connections 25 may be made or circuits may be formed in such a manner that only the amplifier 14a with gain A1, for example, is formed in the circuit (see FIG. 6B). In the example, alternatively, but not shown, amplifier 14b, 14c with either gain A2 or gain A3, respectively, may be formed or connected. In one example, the selection of a particular amplifier may be made by selecting a corresponding metal-mask during the fabrication of the device 10.

Similarly, and alternatively or in addition, a gain of amplifier 14 may be controlled by one or more resistance values. For example, a plurality of selector resistors 36 (e.g., amplifier resistors 36a, 36b, 36c, 36d) may be formed in substrate 18 and in line to amplifier(s) 14, where a final metal-mask connection 38 to one of multiple possible different points $AB_1$, $AB_2$, $AB_3$, $AB_4$ or other point may be formed resulting in one of multiple possible resistance values that may determine the final gain of amplifier 14. In the example, with reference to FIG. 7, four resistors 36a, 36b, 36c, 36d (e.g., the resistors between points A and B) may be formed in substrate 18, but one or more final metal layer connections 38 may determine where point C connects—to point $AB_1$, $AB_2$, $AB_3$ or $AB_4$. In FIG. 7, dotted lines show potential connections via a metal mask and final metal mask connection 38 shows a connection between points A and C or B and C through resisters 36a, 36b or resistors 36c, 36d, respectively. In the example, point C may be amplifier 14 or other circuit point, or points A and B may be amplifiers 14 or other circuit points. As a result, final metal mask connection(s) 38 may determine a final resistance between points A and C or between points B and C, and the final resistance may set the gain of amplifier 14.

Figure 8:
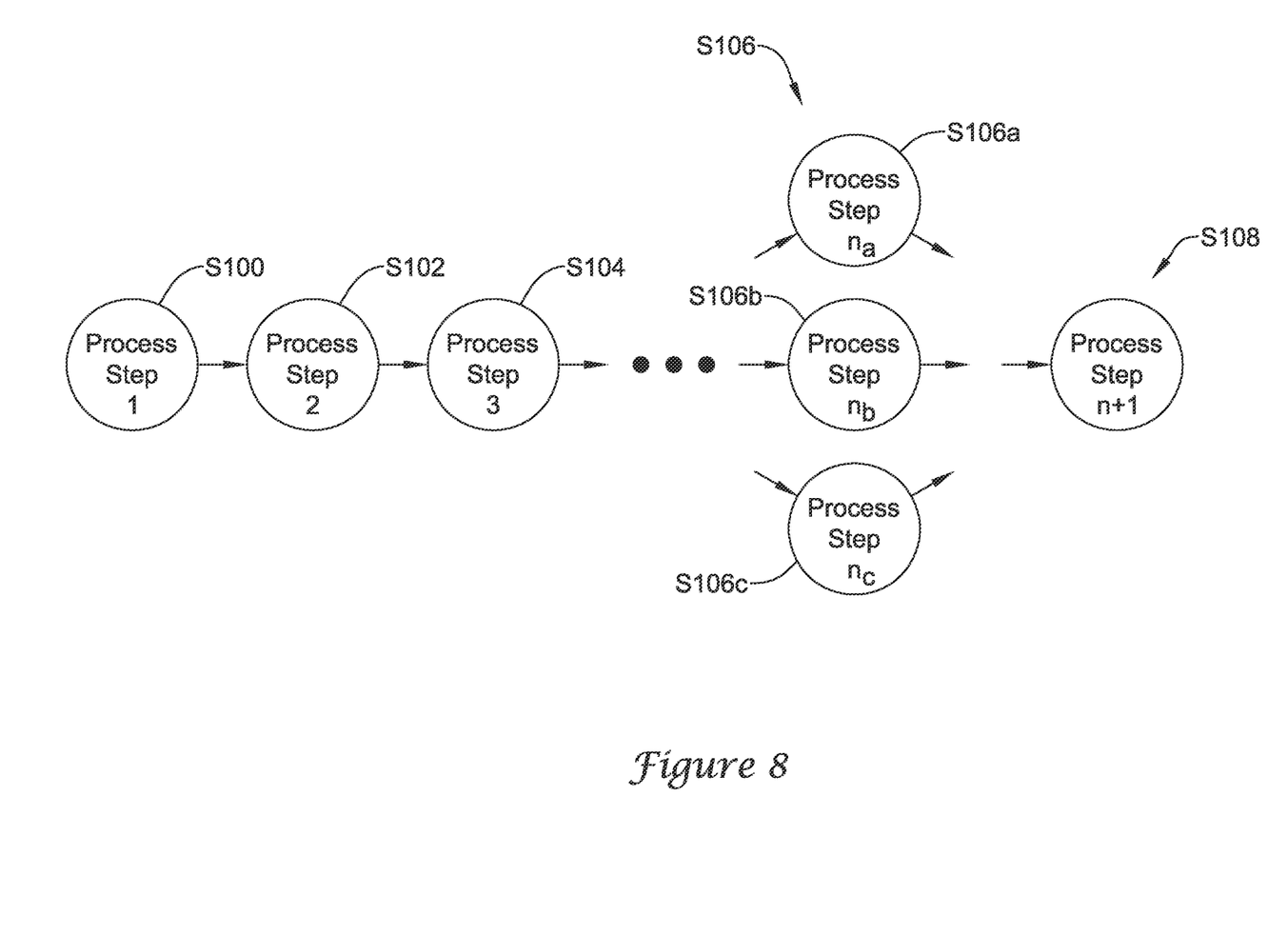
FIG. 8 is a flow diagram of process steps of a fabrication process for an illustrative sense die amplifier combination in accordance with an aspect of the disclosure.

Sense die 12 may be fabricated based on a mostly common set of masks, but the steps performed in conjunction with one or more specific masks may be performed with one of multiple possible masks. Thus, with reference to FIGS. 6A, 6B and 7 and further with reference to FIG. 8, process step 1-S100, process step 2-S102, process step 3-S104 and Process step n+1-S108 may be common to the fabrication of a circuit, such as the circuit depicted in FIG. 6A, but process step n-S106 may be one of three or more different process steps (e.g., process step $n_A$-S106a, which may form amplifier 14 having a first gain, such as amplifier 14a with gain $A_1$ shown in FIG. 6A; or process step $n_B$-S106b, which may form amplifier 14 having a second gain, such as amplifier 14b with gain $A_2$ shown in FIG. 6A; or process step $n_C$-106c, which may form amplifier 14 having a third gain, such as the amplifier 14c with gain $A_3$ shown in FIG. 6A). Process steps $n_A$-S106a, $n_B$-S106b and $n_C$-S106c may include an application of different connections or metal layer masks 25, 38 that are employed during a particular metallization stage of fabrication. For example, such application of connections and metal masks 25, 38 may select how a particular set of resistors 36 or other circuitry (e.g., coupling 24 and amplifier(s) 14) are connected. In the example, process step $n_A$-S106a may correspond to a mask 38 that may connect point C to point $AB_1$ (not shown); process step $n_B$-S106B may correspond to a mask 38 that, with reference to FIG. 7, connects point C to point $AB_2$; etc.

Amplifier variations, such as those depicted in and described with reference to FIGS. 5-7, may be made in view of variations in diaphragm thickness T, such as the available variations depicted in FIG. 10, during or after the manufacturing process. For example, one or two process steps (e.g., S100-S108) (or some other relatively small number) may be substituted in a series of multiple process steps that are employed to fabricate a sense die for at least the purpose of customizing amplifier 14 or die thickness T. In this manner, a "platform design" may be employed to efficiently produce, with one or more relatively small variations (e.g., selection of one of multiple different metal masks at a particular metallization step to create an amplifier having a specific gain among a plurality of possible gains, or a variations in an etch process that results in a diaphragm having one of multiple possible thicknesses, or variation in another characteristic or feature of device 10), a pressure sensor having one of multiple possible characteristics satisfying a customer's specification, such as a particular burst pressure, a particular sensitivity or particular operating range or other particular characteristic, or a combination thereof.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A pressure sensor, comprising:
    a membrane having a sensitivity of less than 4.0 mV/V/1"$H_2O$;
    two or more sense elements on the membrane connected in a bridge configuration to form a Wheatstone bridge, wherein the Wheatstone bridge has an output; and
    an amplifier having an input coupled to the output of the Wheatstone bridge, the amplifier also having an output wherein the output of the amplifier has a span (mV/V/1"$H_2O$) that is greater than two times the sensitivity.

2. The pressure sensor of claim 1, wherein the span of the amplifier is greater than 2.0 mV/V/1"$H_2O$.

3. The pressure sensor of claim 1, wherein the span of the amplifier is greater than 4.0 mV/V/1"$H_2O$.

4. The pressure sensor according to claim 1, wherein the output of the amplifier has a minimum output value and a maximum output value, and wherein the pressure sensor has an input pressure range that causes the output of the amplifier to go between the minimum output value and the maximum output value, and wherein the output of the amplifier has a Terminal Based Linearity (TBL) of less than 1 percent from the minimum output value to the maximum output value.

5. The pressure sensor of claim 4, wherein the output of the amplifier has a Terminal Based Linearity (TBL) of less than 0.1 percent from the minimum output value and the maximum output value.

6. The pressure sensor of claim 4, wherein the output of the amplifier has a Terminal Based Linearity (TBL) of less than 0.05 percent from the minimum output value and the maximum output value.

7. The pressure sensor according to claim 1, wherein when a greater input pressure is applied to a front side of the membrane than to a back side of the membrane, the output of the amplifier produces a positive output signal, and when a greater input pressure is applied to the back side of the membrane than to the front side of the membrane, the output of the amplifier produces a negative output signal, wherein a maximum deviation between the positive output signal and the negative output signal for a given absolute input pressure is less than 0.5%.

8. The pressure sensor according to claim 1, wherein the membrane has a maximum deflection relative to a rest position of less than 1 micron at 1"$H_2O$.

9. The pressure sensor according to claim 1, wherein the membrane has a maximum deflection relative to a rest position of less than 0.1 micron at 1"$H_2O$.

10. The pressure sensor of claim 1, wherein the sensitivity of the membrane is less than 1.0 mV/V/1"$H_2O$.

11. The pressure sensor of claim 1, wherein the amplifier has a span that is greater than 4.0 mV/V/1"$H_2O$.

12. The pressure sensor of claim 9, wherein the output of the amplifier has a span that is greater than 10.0 mV/V/1"$H_2O$.

13. A pressure sensor, comprising:
a membrane;
two or more sense elements on the membrane connected in a bridge configuration to form a Wheatstone bridge, wherein the Wheatstone bridge has an output;
an amplifier having an input coupled to the output of the Wheatstone bridge;
wherein an output of the amplifier has a minimum output value and a maximum output value; and
the pressure sensor has an input pressure range that causes the output of the amplifier to go between the minimum output value and the maximum output value, wherein the output of the amplifier has a Terminal Based Linearity (TBL) of less than 1 percent from the minimum output value to the maximum output value.

14. The pressure sensor of claim 13, wherein the membrane has a sensitivity of less than 4.0 mV/V/1"$H_2O$.

15. The pressure sensor of claim 14, wherein the amplifier has a span that is greater than 2.0 mV/V/1"$H_2O$.

16. A pressure sensor, comprising:
a membrane having a sensitivity;
two or more sense elements on the membrane connected in a bridge configuration to form a Wheatstone bridge, wherein the Wheatstone bridge has an output;
an amplifier having an input, an output, and a gain that is greater than 2, the input of the amplifier is coupled to the output of the Wheatstone bridge;
the output of the amplifier has a minimum output value and a maximum output value, and wherein the pressure sensor has an input pressure range that causes the output of the amplifier to go between the minimum output value and the maximum output value;
the sensitivity of the membrane is such that the output of the amplifier remains between the maximum output voltage and the minimum output voltage over a given range of input pressures;
the output voltage of the amplifier having a span that is greater than 2.0 mV/V/1"$H_2O$.

17. The pressure sensor of claim 16, wherein the sensitivity of the membrane is less than 4.0 mV/V/1"$H_2O$.

18. A pressure sensor comprising:
a diaphragm having a portion that flexes in response to a media impinging thereon, wherein the extent to which the portion of the diaphragm flexes varies with an input pressure at which the media impinges, the portion of the diaphragm withstanding media impinging thereon across a range of input pressures between a negative burst pressure and a positive burst pressure;
one or more sensor elements fixed relative to the diaphragm, the one or more sensor elements have a property that varies with the extent to which the diaphragm flexes; and
an amplifier having an input and an output, and being disposed on a substrate to which the diaphragm is attached, wherein the input of the amplifier senses variations in the property of the one or more sensor elements, and the output of the amplifier has a full range that corresponds to no more than 1% of the range of input pressures.

19. A pressure sensor comprising:
a sense die with an integrated differential amplifier having a supply voltage, the sense die having a pressure sensitive membrane with a sensitivity of less than 4.0 mV/V/1"$H_2O$;
a first bridge for sensing a flex of the pressure sensitive membrane in response to an input pressure;
a second bridge coupled in parallel to the first bridge for trimming the first bridge; and
wherein the integrated amplifier has an output with a common-mode signal of approximately one-half a magnitude of the supply voltage and a maximum differential output within the range of 6 mV to 180 mV.

20. A micro-machined pressure sensor, comprising:
a silicon substrate;
a sensing diaphragm including sensing elements for converting an applied input pressure to a differential voltage signal with a common mode voltage of about half a supply voltage, the sensing diaphragm has a geometry that provides a pressure sensitivity of less than 4.0 mV/V/1"$H_2O$;
a differential in and differential out amplifier with a gain of at least 6, and a common voltage of about half the supply voltage;
an electrical connection supplying the differential voltage signal from the sensing diaphragm to the differential input of the differential in and differential out amplifier; and
electrical connections for a differential output of the differential in and differential out amplifier; and
wherein the differential output of the differential in and differential out amplifier has a span (mV/V/1"$H_2O$) that is greater than two times the sensitivity, and a Terminal Based Linearity (TBL) of less than 1%.

21. A pressure sensor, comprising:
a substrate;
a membrane formed integral with the substrate;
two or more sense elements coupled to the membrane, the two or more sense elements connected in a bridge configuration to form a Wheatstone bridge, wherein the Wheatstone bridge has an output; and
an amplifier block formed integral with the substrate, the amplifier block having an output and further having an input coupled to the output of the Wheatstone bridge, the amplifier block having a selectable gain, and an output having a Terminal Based Linearity (TBL) of less than 1% from a minimum output value to a maximum output value of the amplifier block.

22. The pressure sensor of claim 21, wherein the gain is selectable during manufacture of the pressure sensor.

23. The pressure sensor of claim 21, wherein the gain is selectable by a user of the pressure sensor.

24. The pressure sensor of claim 21 further comprising one or more trim elements, wherein the one or more trim elements, when trimmed, are used to permanently offset an output voltage produced at the output of the Wheatstone bridge.

25. The pressure sensor of claim 24 wherein the one or more trim elements are trimmed in a first way for a first selected gain of the amplifier and are trimmed in a second different way for a second selected gain of the amplifier.

26. The pressure sensor of claim 24, wherein the output of the Wheatstone bridge is a differential output signal that has a common mode voltage, wherein the one or more trim elements are used to permanently modify the common mode voltage at the output of the Wheatstone bridge.

\* \* \* \* \*